Figure 2:
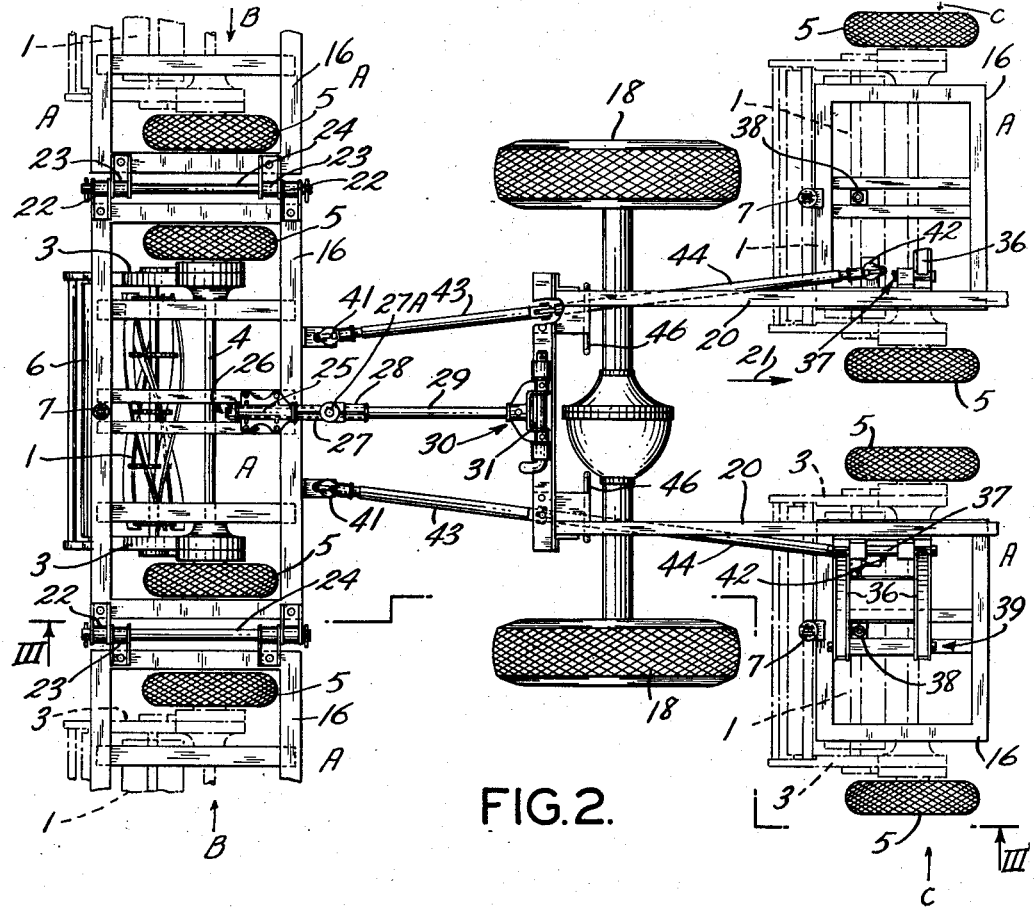

Nov. 17, 1953 — H. IMBT — 2,659,190
GANG MOWER INTERCONNECTING MEANS
Filed Feb. 6, 1950 — 3 Sheets-Sheet 1
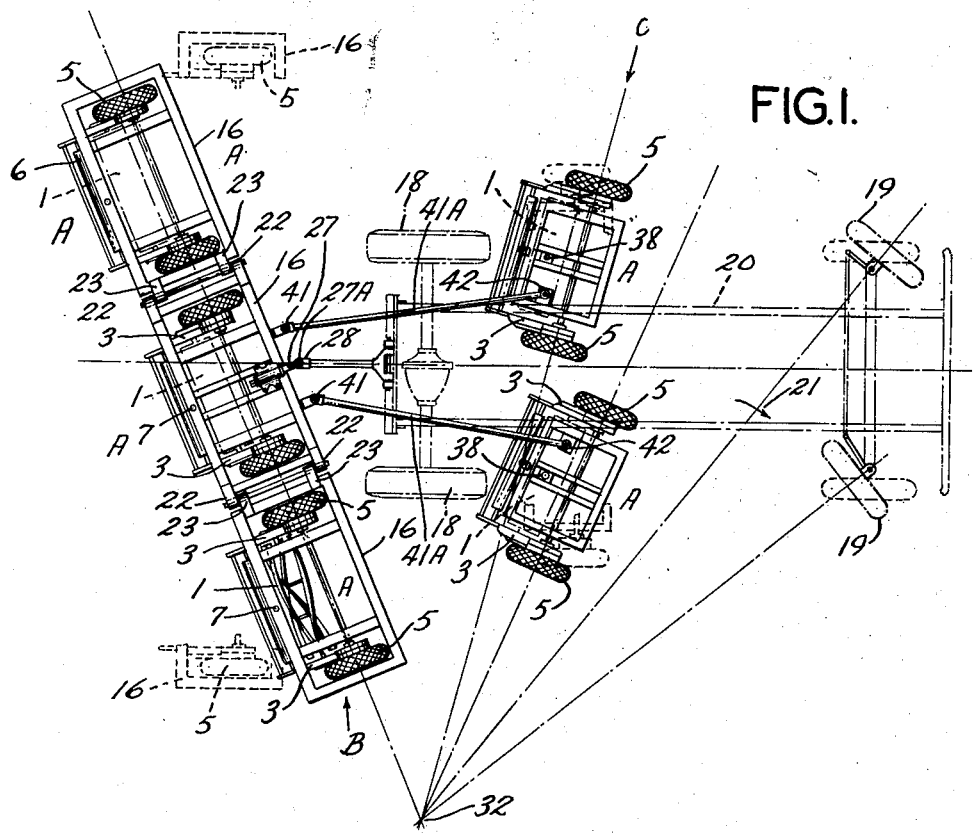
FIG.I.
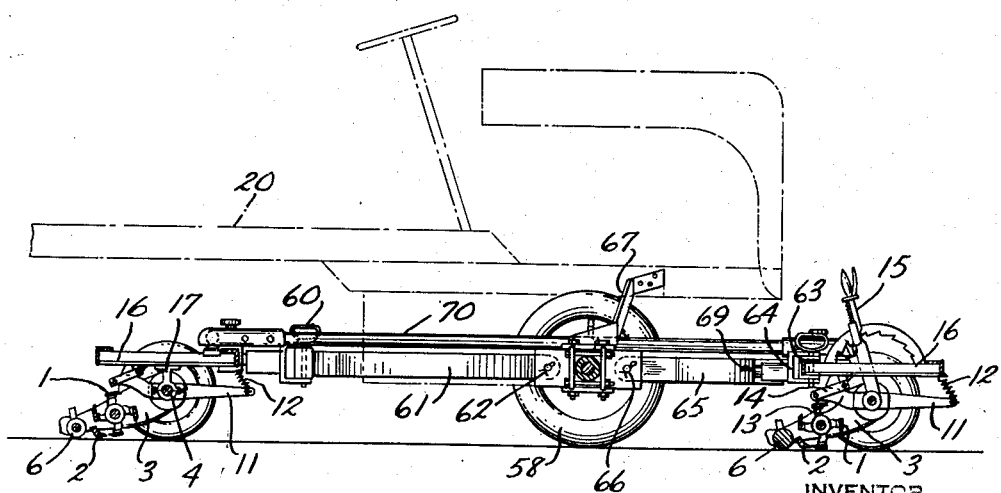
FIG.5.
INVENTOR
Herbert Imbt
BY
his ATTORNEY Nov. 17, 1953   H. IMBT   2,659,190
GANG MOWER INTERCONNECTING MEANS
Filed Feb. 6, 1950   3 Sheets-Sheet 2

INVENTOR
Herbert Imbt
BY
ATTORNEY

Patented Nov. 17, 1953

2,659,190

UNITED STATES PATENT OFFICE 2,659,190

GANG MOWER INTERCONNECTING MEANS

Herbert Imbt, Stroudsburg, Pa., assignor to Worthington Mower Company, Stroudsburg, Pa., a corporation of Delaware Application February 6, 1950, Serial No. 142,600

8 Claims. (Cl. 56—7)

My invention relates to gang lawn mowers, that is to say, to lawn mowers having a plurality of mowing units.

In gang lawn mowers the mower units are arranged usually in two or more rows, and the units of the two rows are intended to be so disposed, relative to each other, that strips of grass left uncut by the forward row are cut by the mower units of the rear row or rows. However when a gang moves in a curved path, the reaction of the ground on the wheels of the various units, tends to cause the units of one row to move to one side as it were, relative to the units of the other row, and thereby cause uncut strips of grass to be left when going around curves. Various arrangements have been devised to overcome this fault. In some, each mower unit of a rear row is caused to overlap the two mower units ahead of and at the sides of it, a considerable distance, so that despite any movement of, say, a rear mower unit to one side in passing around a curve, it will still cut the strip of grass left uncut by the two units ahead of it. However with this arrangement the total swath cut by the gang when moving straight ahead is less than it would be except for this considerable overlapping. Again, it has been proposed to shift sidewise the draft points, to call them such, of the mowers of one row when going around curves, thereby counteracting the natural tendency of the units of that row to shift sidewise with respect to the mowers of another row. Still again, it has been proposed to interconnect the mower units and the steering mechanism or arrangement of the gang, in such a manner that each mower unit is forced to follow a certain definite path and thereby cut a certain definite strip of grass regardless of the position the unit tends to take under the reaction of the ground on it. With such arrangements however, as heretofore made, the mower unit wheels are forced to slide on the turf more or less, and thereby scuff the turf.

According to the present invention the mower units are so interconnected that each is required to follow a particular path, but a path that is determined, as it were, by the reaction of the ground on the gang as a whole. Thereby the swaths cut by the various units are caused to overlap one another with as little lapping of the mower units one over another, and as little scuffing of the turf, as may be. Further, the arrangement is one that requires little mechanism additional to the mower units themselves and that needed to connect them in gang formation, and one that readily permits mower units to be disposed ahead of a tractor used to propel the gang.

The gang may be placed behind a tractor, or ahead of a tractor, or placed between the forward and rear wheels of the tractor, or a part of the gang may be placed between the forward and rear wheels of the tractor and the remainder either ahead or behind the tractor.

Figure 3:
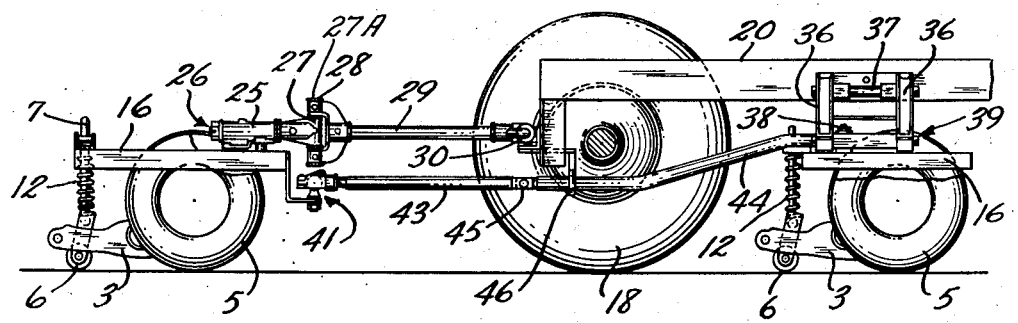
Figure 4:
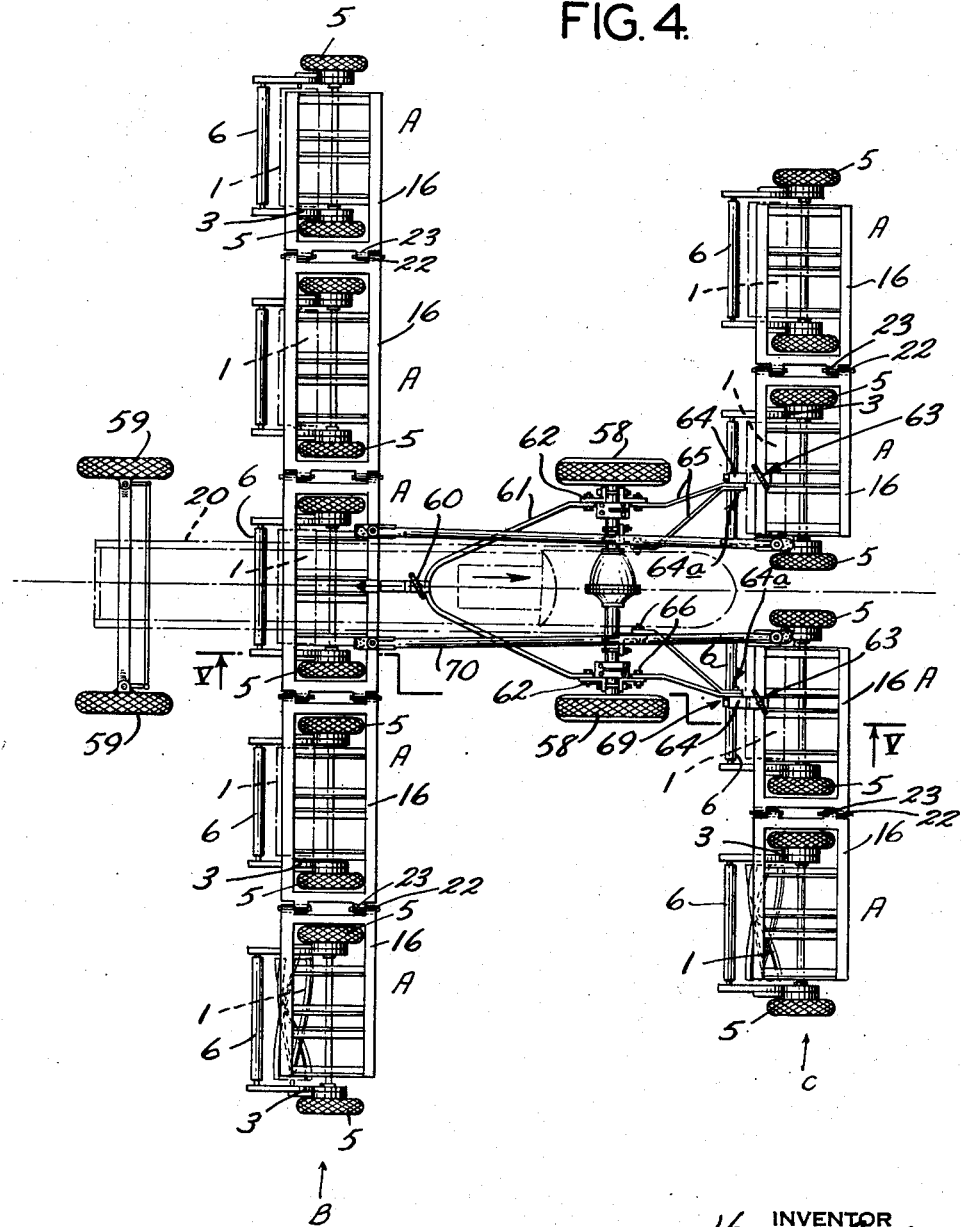

The accompanying drawings illustrate two of the various forms which my invention may assume. In each figure parts have been omitted for clarity of illustration as will be understood. Fig. 1 is a plan view of a gang in which some of the mower units are located between the forward and the rear wheels of the tractor which propels the gang and others are located behind the tractor, the frame of the tractor being the frame by which parts of the gang are connected together and the tractor being only indicated in broken lines. Fig. 2 is a plan view of a modification in construction of a part of the mechanism of Fig. 1 drawn to a larger scale and with parts broken away, the parts being in the positions they occupy when the gang is moving straight ahead, rather than when rounding a curve as in Fig. 1. Fig. 3 is a section on substantially the line III—III of Fig. 2. Fig. 4 is a plan view of another arrangement having a greater number of mower units and wherein a part of the gang is carried ahead of the tractor. Fig. 5 is a section on substantially the line V—V of Fig. 4.

Speaking generally, the mower units A of the gangs illustrated are alike and substantially conventional. That is to say, each has a conventional rotary fly knife 1 cooperating with a horizontal stationary bed knife 2, the two being supported by the lower ends of two frames or cases 3. The upper ends of these frames or cases are carried by two wheels 5 running on the ground. The member 4 may be the axle of the wheels or merely a bar connecting the upper ends of the cases or frames 3. One or both of the frames or cases 3 contains gearing through which one or both of the wheels 5, driven by its contact with the ground, drive the rotary cutter or fly knife 1. The height of the cut may be fixed by, for example, the conventional roller 6 journaled in or on the frames or cases 3 of the respective mower units, and each unit may be provided with mechanism for raising or lowering its roller 6 relative to the bed knife 2 for changing the height of the cut, etc., as is conventional and indicated at 7. Also if desired springs 12 acting directly on the rear ends of the frames or cases 3, or indirectly through arms 11 connected to the frames or cases, can be used to urge the fly knife toward the ground. Again if desired provision can be made for lifting the bed knife and fly knife from cutting position; e. g. at each unit an arm 13 can be connected to the frames or cases 3 and this connected to a link 14 which in turn is fastened to a hand lever 15 by which the tails of the mower units can be elevated to non-cutting position or lowered to the ground again. Also in the machines illustrated each mower unit is provided with a horizontal rectangular frame 16 which is carried on two standards 17 which straddle the axle or connecting bar 4 and thereby support the rectangular frame, more or less as has been used heretofore. The attachments 7 and 15 may be connected to these frames 16 as will be understood. It will be understood however that various forms of mower units can be used with my invention.

Referring now to the mechanism of Figs. 1, 2 and 3 particularly: In this embodiment of the invention the various mower units are connected to and propelled by a frame 20. In the present instance this is the frame of a motor driven tractor, although this is not altogether an essential feature of the invention. The rear and driving wheels of the tractor are shown at 18 and its forward and steering wheels at 19. The forward direction of movement of the tractor is indicated by the arrow 21 in Figs. 1 and 2. Back of the tractor in this instance a number of mower units A, specifically three, are connected together in endwise relation in a row B. The illustrated interconnection of these three units in a row is substantially a conventional one. That is to say, the frame 16 of the middle unit has knuckles 22 at each of its ends, and each of the other two mower units has cooperating knuckles 23, and a cylindrical bar 24 passes through each group of four knuckles to complete hinges having horizontal longitudinal axes; accordingly each of the two end units can pivot on the center unit, in a vertical plane as the machine passes over irregular terrain. Also as heretofore the center or middle unit is provided with a longitudinally extending journal or bracket 25 in which a cylindrical bar or pin 26 is free to turn and by which the row is propelled; the bar and bracket permit the middle unit and the row as a whole to turn or pivot in a transverse vertical plane independently of the propelling device as the terrain may require. Also this bar or pin 26 carries one part 27 of a vertical pivot 27A, the cooperating portion 28 of which is carried by a bar 29 that is hinged at 30 on a horizontal transverse pin 31 connected to the rear end of the frame 20. The horizontal pivoting at 30 permits the row of mower units to rise and fall in a longitudinal vertical plane as the terrain may require, while the vertical pivot at 27A forms the draft point of the row and permits the row of mower units to turn sidewise, i. e. to the right or to the left, as the frame 20 moves the row in a curved path. The degree to which the row of mower units swings to the right or to the left at any time depends of course substantially on the momentary radius of curvature of the paths traveled by the frame 20 and the gang. When the gang is traveling straight ahead, this row of mower units lies substantially at right angles to the direction of travel as indicated in Fig. 2, and in broken lines in Fig. 1. In full lines in Fig. 1, the row is shown in the position it occupies with respect to the tractor or frame 20 when the gang is traveling along a curved path having a center at, say, 32.

Other mower units, namely two units to cut the strips of grass that pass uncut between adjacent mower units of the row just described, are fastened to the sides of the frames in the present instance and in effect constitutes a second row C. For this purpose a secondary frame 36 projects from and is hinged by a horizontal longitudinal bar 37 to each side of the main frame 20. These secondary frames 36 are omitted from Fig. 1, and a part of one is omitted from Fig. 2, for clarity of illustration. At its opposite end each of these frames carries a vertical pivot 38 which may be hinged to its frame, on a longitudinal horizontal axis at 39. Each of these pivots is attached to another mower unit. The position of this pivot 38 on each of these other mower units is subject to variation as appears hereafter, but in each case these pivots 38 permit these two forward mower units to turn sidewise with respect to the main frame 20 as appears in Fig. 1, and the hinging at 37 and 39 permits these mower units to rise and fall with respect to the gang frame 20 in passing over irregularities of the ground. Also these pivots 38 constitute the draft points through which these forward units are propelled. It will be observed of course that if desired these two forward mower units are readily disposed in front of the rear wheels 18 of the driving tractor and thus made to cut the grass in the path of these wheels before it is pressed down by these wheels.

Connections, specifically connecting rods 41A, extending between the advance mower units hinged at 38 and the row of mower units behind them, position the two forward units with respect to sidewise turning. It is not necessary therefore that the draft points 38 of these other mower units be located in advance of the axial lines of their ground wheels; they may be located wherever most convenient on the units or most appropriate to secure the desired positioning of the units with respect to sidewise turning. Each of these connecting rods 41A is hinged on a vertical axis at some point 41 on the rear row of mower units, usually a little distance at one side of the row draft point 27A, and also is hinged on a vertical axis at some point on 42 to one of the advance mower units. To give some flexibility to each of these connecting rods 41A when passing over irregular terrain, each can be composed of two rod-like members 43 and 44 which are hinged together on a horizontal transverse axis 45, see Fig. 2 and Fig. 3. Transversely elongated loops 46 mounted and stationary on the frame 20, and through which the connecting rods 43—44 pass loosely, prevent the two parts of each connecting rod collapsing one on another under the compressive forces to which they are subjected.

In operation therefore, the row of mower units, shown at the left-hand in Figs. 1 and 2, lies substantially at right angles to the path of movement when the frame 20 is moving the mowers straight ahead as shown in Fig. 2. The row takes this position because of the placement of the draft point 27A of the row in advance of the axial line (at 4) of the wheels 5 of the middle unit of the row, and in fact in advance of the axial line of all the wheels of the row illustrated in the drawing. The connecting rods 43—44 then will hold the two other or advance mower units, i. e. those at the right-hand in Fig. 2, in proper position, i. e. transverse to the direction of movement, where they will properly cut grass passing uncut through the mower row behind them. As the frame 20 is moved along a curved path however, when the various mower units should follow curved paths also, the constantly changing direction of the frame 20 and the reaction of the ground on the wheels 5 of the (left hand) row cause this row of mowers to turn to one side at its pivot or draft point 27A as illustrated in Fig. 1 for example. This change of position of the row and the corresponding shifts of the connecting rods 43—44, cause the two forward mower units to turn to positions where they still continue to cut grass that passes uncut between mower units of the row, i. e. as the gang runs in the curved path. When again the frame 20 (which in the present instance can be steered by the steering wheels 19) is again brought to a straight path, the swinging of the (left-hand) row of mower units of its initial, Fig. 2, position, causes this row, still acting through the connecting rods 43—44, to restore the two advance units to their straight ahead positions. The reaction of the ground on the two other or advance (right-hand in Fig. 2) mower units tends to affect the positioning of the mower unit system as a whole of course, but by making the row larger than the sum of the other mower units that the row is intended to direct, or by appropriate leverage, the effect of the row can be made to predominate. Thus the effect of three mower units in the row is predominant over the effect of the two mower units which are in advance of the row in the present instance.

The positions of the pivots 41 and 42 on the row and other units are so chosen of course that this desired action of the advance mower units is obtained. In other words, the proper positioning of the other or controlled mower units is first determined and then positions for the pivot 41 and 42 to secure this result are selected. This is a mere matter of geometry as will be apparent, and for any desired result the pivots 41 and 42 can occupy various positions. When the advance units are to turn in a direction opposite to the direction of turning of the row as in Fig. 1, the pivots 41 and 42 respectively are placed at opposite sides of the draft points which respectively are adjacent them; i. e. one pivot point 41 is placed to the left (or above as shown in Fig. 1) of the draft point or vertical pivot at 27A while its related pivot 42 is placed to the right (below as shown) of its adjacent draft point or center of rotation 38. However, either or both of the pivots 41 can be disposed closer to or farther from the axle or connecting bar 44 than shown in the drawings, providing the position of the respectively related vertical pivot 42 is changed relatively. Speaking generally, for a given degree of turning of either of the one or the other of the advance units, the farther its pivot point 41 is placed from the row draft point 27A, in a direction parallel to the length of the row, the farther its pivot point 42 is to be placed to the rear on the mower unit, or the farther its pivot point 42 is to be placed from its draft point 38 in a direction parallel to the axial line of the wheels of the unit; such changes may be combined to secure the desired result.

Figs. 4 and 5 illustrate various modifications that can be made. The machine of these figures is substantially like that of the preceding figures except in the following respects: The frame 20 or tractor is propelled by its forward wheels 58 and is steered by its rear wheels 59, instead of the reverse as in the preceding figures; this however is a quite immaterial matter. Again the mower units A are arranged in two rows B and C, but the row which is permitted to turn sidewise freely as the resistance of the ground on its mower units may require, again the rear row, is composed of five mower units rather than three. The two extra units are added to the middle unit of the row of Fig. 1, as will be understood from the drawing. Also, instead of there being only one controlled mower unit on each side of the frame as in Fig. 1, a number of units are applied at each side, namely two in the present instance, the second being hinged on a horizontal longitudinal axis to the end of the initial unit in the same manner as the units of the rear row are hinged together. As before a single draft point or vertical pivot 60 (say corresponding to 27A) is provided for the whole rear row of mower units. In the present instance however this draft point or vertical pivot is carried by a frame 61 which is hinged on two horizontal transverse pivots 62 of the tractor. These hinges at 62 perform the same function as the hinge at 30—31 of Fig. 1 of course. At each side of the tractor the two advance mower units are propelled by a single draft point or vertical pivot 63, one side 64 of which is hinged on a horizontal transverse axis 64a to a frame 65 which is hinged on transverse horizontal axes 66 to the frame 20, rather indirectly in this instance since in this instance the body framework 20 of the tractor illustrated, is connected to the axle of the drive wheels 58 by brackets 67, which however can be considered as parts of the frame 20. The part 64 of each of the vertical pivots at 63 is mounted on a horizontal longitudinal pivot at 69 so that each of the forward unit-groups can rock in a vertical transverse plane in following irregularities of the terrain. A single connecting rod 70, at one end pivoted to the rear row of units of a vertical axis, and at its other end pivoted on a vertical axis at an appropriate place on one of the forward mower-unit groups, serves to position each of the forward groups as a whole.

The operation of this machine of Figs. 4 and 5 is so like that of Figs. 1 to 3 that the description of the operation of the first will suffice.

It will be understood that my invention is not limited to the details of construction and operation described above and illustrated in the accompanying drawings except as appears hereafter in the claims, and that the claims are intended to include equivalents of the elements named in them as well as those elements themselves.

I claim:

1. In a gang mower, the combination of at least two mower units arranged one in advance of and to one side of the other, at least one of said units having wheels to run on the ground, the draft point of said one of the units being in advance of the axial line of said wheels, and said unit being free to turn to the side as it is propelled at said draft point, the other of said two units also being turnable to the side, and a member connecting said two units through which the first mentioned of said two units positions the other of said two units with respect to sidewise turning.

2. In a gang mower, the combination of at least two mower units arranged one in advance of and to one side of the other, at least one of said units having wheels to run on the ground, the draft point of said one of the units being in advance of the axial line of said wheels, and said unit being free to turn to the side as it is propelled at said draft point, the other of said two units having a draft point at which it is propelled and also being turnable to the side, and a member connecting said two units through which the first mentioned of said two units positions the other of said two units with respect to sidewise turning.

3. In a gang mower, the combination of at least two mower units arranged substantially in a row, and having wheels to run on the ground and having at least one draft point in advance of the axial line of said wheels and being free to turn to the side as said mower units are propelled over the ground, at least one other mower unit disposed to cut grass passing between said two mower units and also turnable to the side, and at least one connection between said other mower unit and the mower units of said row through which mower units of said row position said other mower unit with respect to sidewise turning.

4. The subject matter of claim 3, characterized by the fact that there are at least two such other mower units, each disposed to cut grass passing between two adjacent mower units of said row, and the number of such other mower units is less than the number of mower units of said row.

5. In a gang mower, the combination of a frame to which the hereinafter mentioned mower units are connected and by which they are propelled, at least two mower units connected substantially end to end in a row and having wheels to run on the ground, a vertical pivot through which the said row is connected to said frame and on which said row can turn to the side, said pivot being disposed in advance of the axial line of said wheels, at least one other mower unit which is disposed to cut grass passing between said two mower units of the row, a vertical pivot through which said other unit is connected to said frame and on which said other mower unit can turn to the side, and a rod pivoted to said row of units to one side of said vertical pivot of the row and pivoted to said other unit to one side of said vertical pivot of the other mower unit through which said row of units positions said other unit with respect to sidewise turning.

6. The subject matter of claim 5, characterized by the fact that said rod is pivoted to one side of the vertical pivot of the row and to the opposite side of the vertical pivot of the said other mower unit.

7. The subject matter of claim 5, characterized by the fact that there are at least two such other mower units, a vertical pivot to connect each thereof to said frame, and a pivoted rod to connect each of the latter mower units to said row of mower units for sidewise positioning, the number of such other mower units being less than the number of mower units in said row.

8. The subject matter of claim 7, characterized by the fact that said other mower units are disposed in advance of said row of mower units.

HERBERT IMBT.

References Cited in the file of this patent

UNITED STATES PATENTS

| Number | Name | Date |
| --- | --- | --- |
| 1,260,631 | Braun | Mar. 26, 1918 |
| 1,279,266 | Coldwell | Sept. 17, 1918 |
| 2,099,902 | Moyer et al. | Nov. 23, 1937 |